United States Patent
Pete et al.

(10) Patent No.: US 7,121,728 B2
(45) Date of Patent: Oct. 17, 2006

(54) SEAL FOR A BEARING ASSEMBLY

(75) Inventors: Reginal A. Pete, Caledonia, IL (US); Omar J. Fakhoury, Rockford, IL (US)

(73) Assignee: Gunite Corporation, Rockford, IL (US)

( * ) Notice: Subject to any disclaimer, the term of this patent is extended or adjusted under 35 U.S.C. 154(b) by 0 days.

(21) Appl. No.: 10/910,832

(22) Filed: Aug. 4, 2004

(65) Prior Publication Data
US 2006/0029314 A1  Feb. 9, 2006

(51) Int. Cl.
*F16C 33/78* (2006.01)
(52) U.S. Cl. ........................... 384/477; 384/571
(58) Field of Classification Search ................. 384/551, 384/571, 477, 607
See application file for complete search history.

(56) References Cited

U.S. PATENT DOCUMENTS 4,692,040 A    9/1987  Ebaugh et al.
4,997,294 A    3/1991  Hillmann
5,492,419 A *  2/1996  Miller et al. ................. 384/551

\* cited by examiner

*Primary Examiner*—Lenard A. Footland
(74) *Attorney, Agent, or Firm*—Michael Best & Friedrich LLP

(57) ABSTRACT

A bearing assembly for a wheel assembly. In some constructions and in some aspects, the bearing assembly includes a housing defining a cavity therethrough, a first bearing cone positioned within the cavity and a second bearing cone positioned within the cavity and spaced from the first bearing cone. A first plurality of rollers is positioned between and engageable with the housing and the first bearing cone and a second plurality of rollers is positioned between and engageable with the housing and the second bearing cone. A seal seals the space between the first bearing cone and the second bearing cone. In some constructions and in some aspects, the seal is non-metallic or elastomeric.

39 Claims, 4 Drawing Sheets

SEAL FOR A BEARING ASSEMBLY

FIELD OF THE INVENTION

The present invention relates to bearing assemblies and, more particularly, to seals for bearing assemblies.

BACKGROUND OF THE INVENTION

Bearing assemblies are used in a variety of applications, such as automotive wheel assemblies, trailer wheel assemblies, and other wheel assemblies. In such applications, a wheel axle is positioned within a cavity of the bearing assembly and the bearing assembly is positioned within a cavity of a wheel hub. The bearing assembly facilitates relatively low frictional rotation of the wheel hub and a wheel supported on the wheel hub relative to the wheel axle. Typical bearing assemblies include a pair of bearing cones, an outer bearing cup surrounding the bearing cones, a plurality of rollers positioned between the bearing cones and the outer bearing cup, and a metallic retaining clip for connecting the bearing cones together.

SUMMARY OF THE INVENTION

In some constructions and in some aspects, the invention provides a bearing assembly including a housing defining a cavity therethrough. A first bearing cone is positioned within the cavity and a second bearing cone is positioned within the cavity and spaced from the first bearing cone. A first plurality of rollers is positioned between and engageable with the housing and the first bearing cone and a second plurality of rollers is positioned between and engageable with the housing and the second bearing cone. A seal seals the space between the first bearing cone and the second bearing cone.

The invention also provides a wheel assembly connectable to a wheel axle. The wheel assembly includes a wheel hub defining a hub cavity therethrough having a cavity wall and a bearing assembly positionable in the hub cavity. The bearing assembly includes a bearing housing having an outer surface engageable with the cavity wall and defining a housing cavity therethrough and a pair of bearing cones positioned within the housing cavity, together defining an inner surface engageable with the wheel axle. The bearing cones have a space therebetween. The bearing assembly also includes a plurality of rollers positioned between and engageable with the housing and the pair of bearing cones and an elastomeric seal positioned between the bearing cones to seal the space between the bearing cones.

The invention further includes a bearing assembly with a housing defining a cavity therethrough. A first bearing cone is positioned within the cavity and a second bearing cone is positioned within the cavity and spaced from the first bearing cone. A first plurality of rollers is positioned between and engageable with the housing and the first bearing cone, and a second plurality of rollers is positioned between and engageable with the housing and the second bearing cone. A non-metallic seal at least partially covers the space between the first bearing cone and the second bearing cone, to seal the space between the first bearing cone and the second bearing cone.

Figure 1:
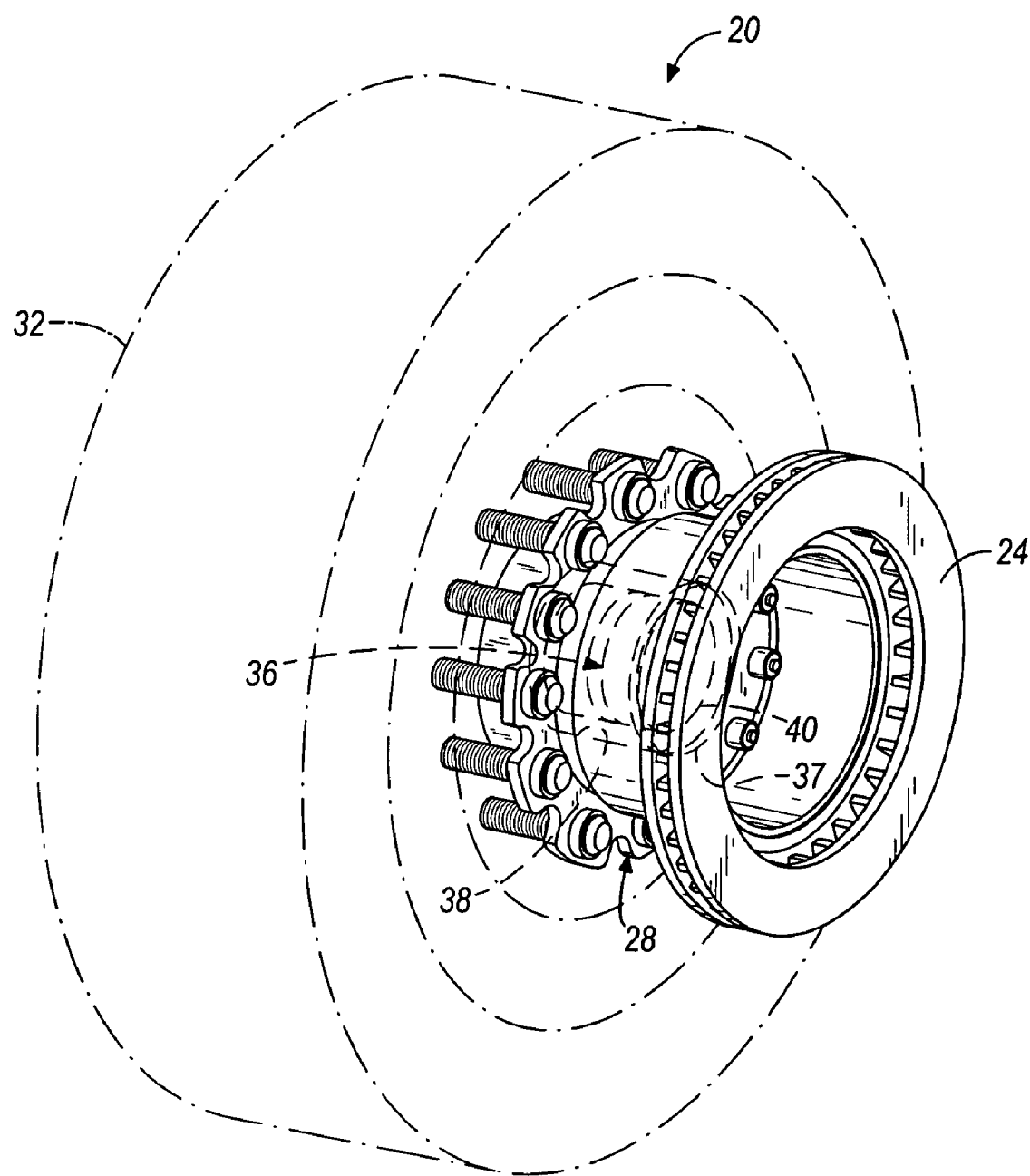
FIG. 1 is a perspective view of a wheel assembly including a bearing assembly.

The invention is not limited in its application to the details of the construction and arrangements of the components set forth in the following description or illustrated in the drawings. The invention is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter and equivalents thereof, as well as possible additional items. Unless limited otherwise, the terms "connected," "coupled," and variations thereof herein are used broadly and encompass direct and indirect connections and couplings. In addition, the terms "connected" and "coupled" and variations thereof are not restricted to physical or mechanical connections or couplings.

DETAILED DESCRIPTION

FIG. 1 illustrates a wheel assembly 20 including a brake rotor 24, a wheel hub 28, a tire or wheel 32, and a bearing assembly 36. A brake pad (not shown) or other braking mechanism is engageable with the brake rotor 24 to control the rotation of the wheel 32. The wheel hub 28 is connected to the brake rotor 24 with a plurality of fasteners and rotates with the brake rotor 24. The brake rotor 24 and the wheel hub 28 each define a cavity 37 and 38, respectively, therethrough that are aligned when the brake rotor 24 and wheel hub 28 are connected. The wheel hub 28 includes a plurality of fasteners, such as, for example a combination of lug nuts and lug bolts, connecting the wheel 32 to the wheel hub 28 and facilitating rotation of the wheel 32 with the wheel hub 28 and the brake rotor 24. The bearing assembly 36 is positioned within the cavity 38 of the wheel hub 28, and the bearing assembly itself defines a bearing cavity 40 for receiving a wheel axle (not shown). The wheel axle can be connected within the bearing cavity 40 in a variety of manners, such as, for example press-fitted, fastened, etc. The axle is connectable to a wheel assembly 20 at each end of the axle.

Figure 2:
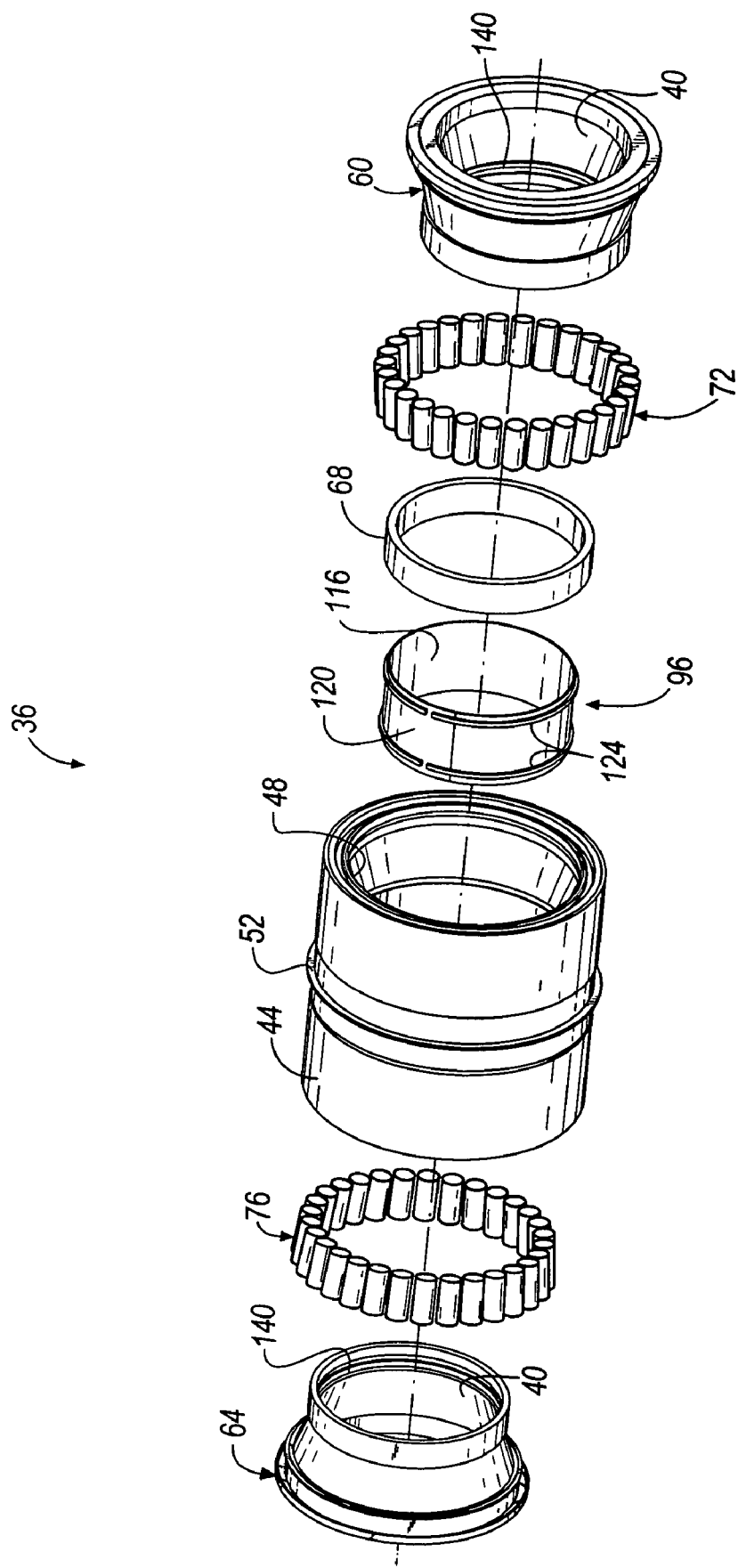
FIG. 2 is an exploded perspective view of the bearing assembly.
Figure 3:
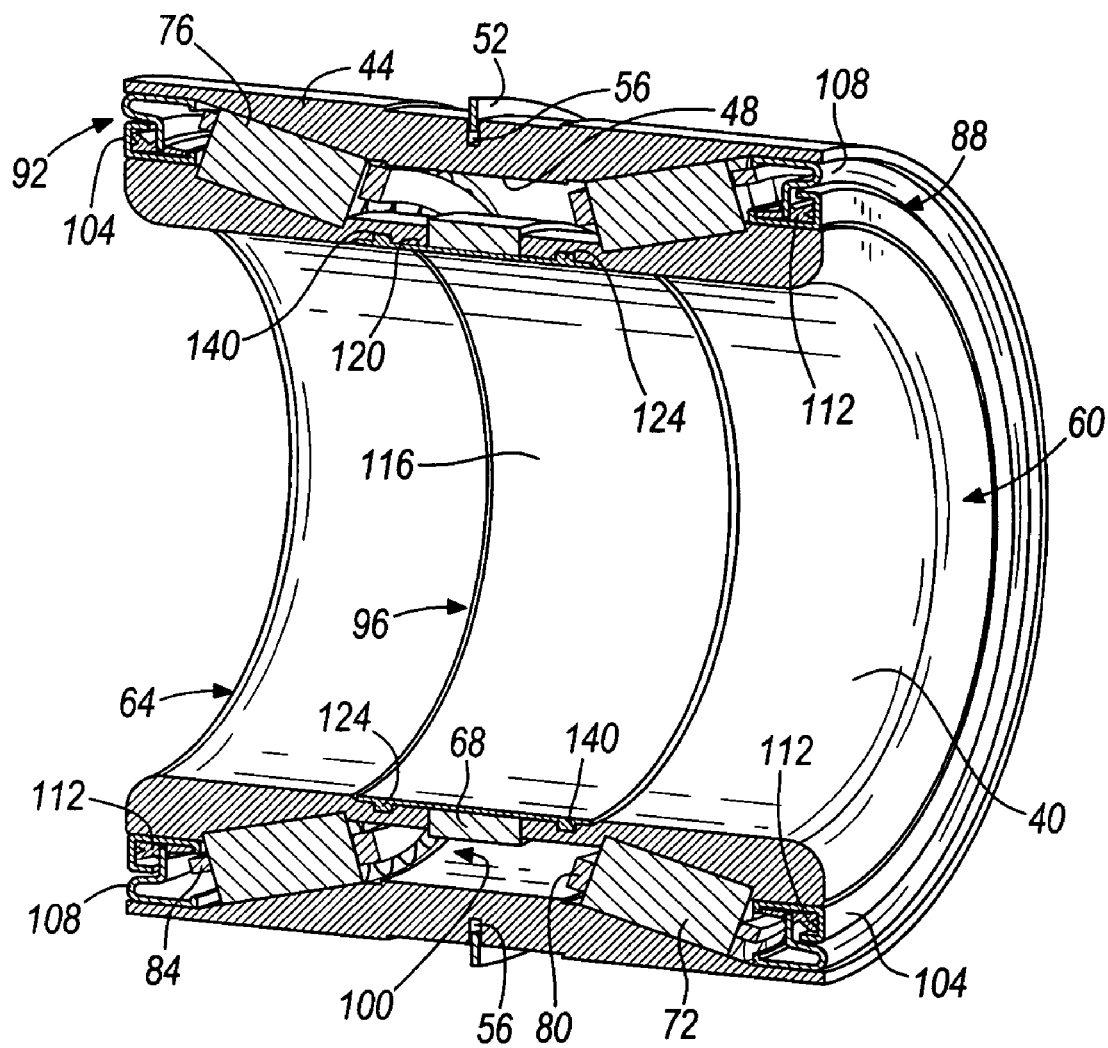
FIG. 3 is a cross-sectional perspective view of the bearing assembly.

With reference to FIGS. 2 and 3, the bearing assembly 36 includes a bearing housing 44 defining a housing cavity 48 therethrough. A retention ring 52 is positioned in an outer groove 56 of the housing 44 and extends around a periphery of the housing 44. The retention ring 52 is engageable within a recess (not shown) defined in a cavity wall of the wheel hub 28 to connect the bearing assembly 36 to the wheel hub 28. The bearing assembly 36 also includes an inner bearing cone 60 and an outer bearing cone 64 positioned within the housing cavity 48 in spaced relation to one another. Together, the inner bearing cone 60 and the outer bearing cone 64 define the bearing cavity 40 therethrough.

As used herein with respect to the bearing assembly 36, the term "inner" will refer to the side of the bearing assembly 36 nearest the brake rotor 24 and the term "outer" will refer to the side of the bearing assembly 36 opposite the inner side and furthest from the brake rotor 24. In addition, the use of "spaced," "space," or variations thereof herein with respect to the bearing cones 60, 64 is used broadly and is meant to encompass constructions wherein the bearing cones 60, 64 abut one another (but there is a small, possibly microscopic, space between them through which fluid might flow or debris might pass) and the constructions wherein bearing cones 60, 64 do not abut one another and are at a distance apart.

In the illustrated construction, the bearing assembly 36 further includes a bearing cone spacer 68, a plurality of inner bearing rollers 72, a plurality of outer bearing rollers 76, an inner bearing roller retainer 80, an outer bearing roller retainer 84, an inner seal assembly 88, an outer seal assembly 92, and a cone seal 96. The bearing cone spacer 68 is positioned in the space between the bearing cones 60, 64. In some constructions, the bearing assembly 36 does not include a bearing cone spacer 68 and the bearing cones 60, 64 abut each other, as discussed above.

The inner bearing rollers 72 are positioned between and engage the bearing housing 44 and the inner bearing cone 60 and the outer bearing rollers 76 are positioned between and engage the bearing housing 44 and the outer bearing cone 64 to facilitate relatively low frictional rotation of the bearing housing 44 relative to the bearing cones 60, 64. The inner and outer bearing roller retainers 80, 84 retain the inner and outer bearing rollers 72, 76, respectively, in an appropriate position between and in engagement with the bearing housing 44 and the inner and outer bearing cones 60, 64. Lubricant is positioned in a bearing roller cavity 100 defined between the bearing cones 60, 64, the bearing housing 44, and the inner and outer seal assemblies 88, 92 to lubricate the bearing rollers 72, 76.

Each of the inner and outer seal assemblies 88, 92 include a cone bracket 104, a housing bracket 108 and an intermediate member 112. The seal assemblies are similar in structure and operation and, therefore, only one of the seal assemblies will be described below. The cone bracket 104 is connected to the respective bearing cone, the housing bracket 108 is connected to the bearing housing 44, and the intermediate member 112 is connected to the housing bracket 108 in close relation to the cone bracket 104. In the illustrated construction, the intermediate member 112 is made of an elastomeric material, such as, for example rubber, plastic, or a polymer, and rotates with the housing bracket 108 and the bearing housing 44 relative to the cone bracket 104 and the bearing cone. The intermediate member 112 contacts or is in close relation with the cone bracket 104 when the bearing assembly 36 is at rest and during rotation in order to inhibit contaminates from entering the bearing roller cavity 100. Such contamination can decrease the effectiveness of the bearing assembly 36 and ultimately cause the bearing assembly 36 to fail. It should be understood that the seal assemblies 88, 92 can have different components and have varying configurations and still be within the spirit and scope of the present invention.

Referring now to FIGS. 2–5, the seal 96 includes a relatively thin body having an inner surface 116 and an outer surface 120. In the illustrated construction, the seal 96 is made of an elastomeric material, such as, for example plastic, rubber, or a polymer, and has two ends 128, 132. A pair of protrusions 124 extend outwardly from the outer surface 120 of the seal 96. The second end 132 of the seal 96 defines a pair of slots 136 therein for receiving portions of the protrusions 124 near the first end 128 of the seal 96. The protrusions 124 near the first end 128 terminate short of the first end 128 (see FIG. 5) to provide a smooth outer surface 120 that is engageable with the inner surface 116 of the second end 132 to facilitate close engagement between the first and second ends 128, 132 when the ends overlap.

Figure 6:
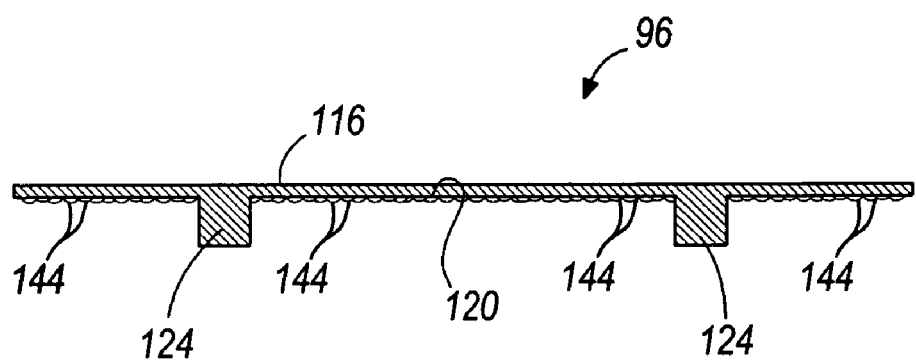
FIG. 6 is cross-sectional view of the seal taken along line 6—6 in FIG. 4.
Figure 4:
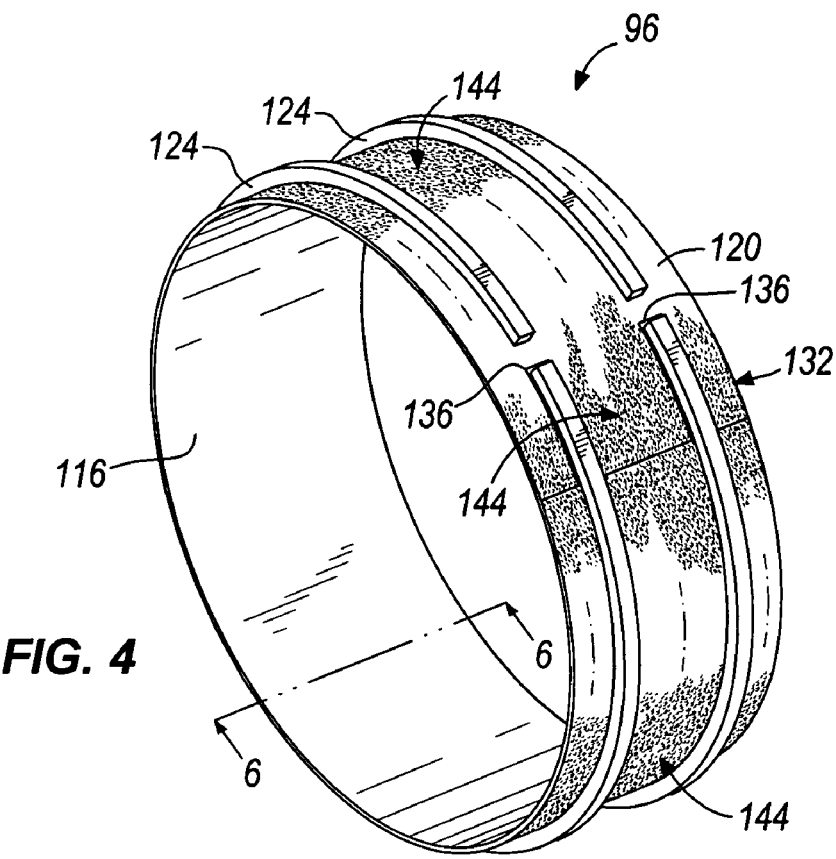
FIG. 4 is a perspective view of a seal of the bearing assembly.
Figure 5:
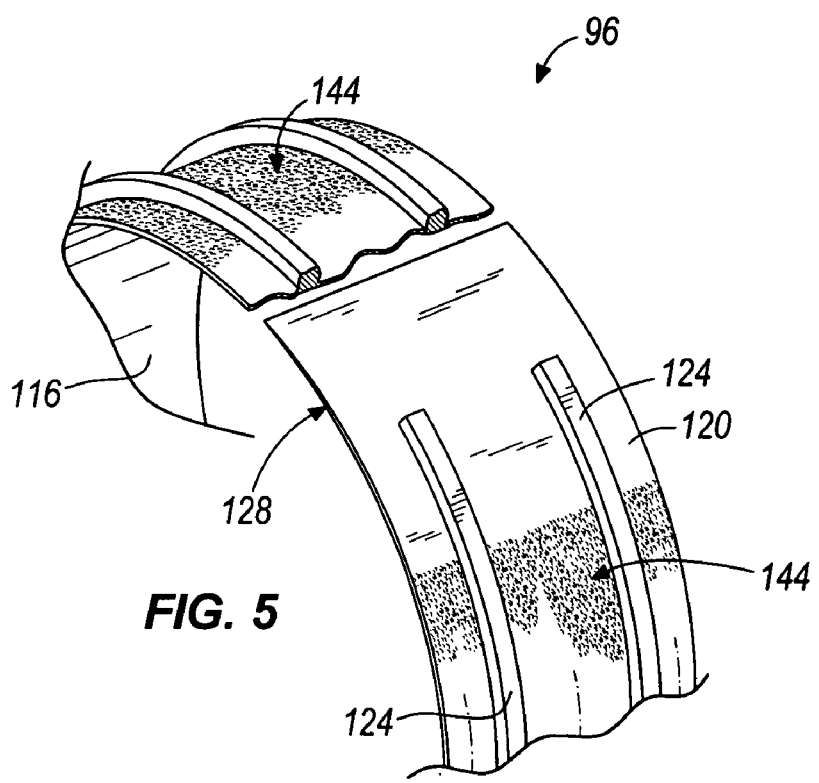
FIG. 5 is an enlarged, partially broken perspective view of the seal.

The seal 96 is positioned within the bearing cavity 40 and spans the space between the bearing cones 60, 64. The protrusions 124 are inserted and snap-fitted into sealing grooves 140, or otherwise frictionally engaged with the sealing grooves 140, defined in the inner and outer bearing cones 60, 64. With reference to FIGS. 4–6, the seal 96 also includes a plurality of sealing bumps 144 that give texture to the outer surface 120 of the seal 96. In the illustrated construction, the sealing bumps 144 are made of the same material as and integral with the rest of the seal 96. In some constructions, the sealing bumps 144 are made of a different material than the rest of the seal 96. The sealing bumps 144 can be made of a variety of materials and can be configured in a variety of manners. As shown in FIG. 5, the sealing bumps 144 are not positioned on the portion of the outer surface 120 that is overlapped by the second end 132 of the seal 96 in order to facilitate close engagement between the first and second ends 128, 132 of the seal 96 when the ends overlap.

The seal 96 performs at least two functions in the bearing assembly 36. First, the seal 96 holds the bearing cones 60, 64 together during handling and installation of the bearing assembly 36 into the wheel assembly 20. The engagement between the protrusions 124 and the sealing grooves 140 inhibits the bearing cones 60, 64 from separating. Second, the seal 96 seals the space between the bearing cones 60, 64. Particularly, the seal 96 inhibits contaminates from entering the bearing roller cavity 100 through the space between the bearing cones 60, 64 and inhibits leakage of the lubricant from the bearing roller cavity 100 through the space between the bearing cones 60, 64. Insertion of the wheel axle into the bearing cavity 40 compresses the seal 96 between the wheel axle and the bearing cones 60, 64, thereby compressing the protrusions 124 into the sealing grooves 140 and forcing the sealing bumps 144 against the bearing cones 60, 64 to seal the space between the bearing cones 60, 64. In some constructions, the seal 96 does not include the sealing bumps 144 and the seal 96 performs both functions of holding the bearing cones 60, 64 together and sealing the space between the bearing cones 60, 64 without the sealing bumps 144.

It should be understood that the seal 96 can include any number of protrusions 124 (including zero) and have any effective configuration and still be within the spirit and scope of the present invention.

Although particular constructions of the present invention have been shown and described, other alternative constructions will be apparent to those skilled in the art and are within the intended scope of the present invention. Thus, the present invention is to be limited only by the claims.

We claim:

1. A bearing assembly comprising:
a housing defining a cavity therethrough;
a first bearing cone positioned within the cavity;
a second bearing cone positioned within the cavity and spaced from the first bearing cone;
a first plurality of rollers positioned between and engageable with the housing and the first bearing cone;
a second plurality of rollers positioned between and engageable with the housing and the second bearing cone; and
a seal sealing the space between the first bearing cone and the second bearing cone;
wherein the seal includes a first protrusion and a second protrusion, and wherein the first bearing cone defines a first groove and the second bearing cone defines a second groove, the first protrusion being positioned within the first groove and the second protrusion being positioned within the second groove; and wherein the first protrusion and the second protrusion extend circumferentially around an outer surface of the seal.

2. The bearing assembly of claim 1, wherein the seal is at least partially non-metallic.

3. The bearing assembly of claim 1, wherein the seal is at least partially polymeric.

4. The bearing assembly of claim 1, wherein the seal is at least partially elastomeric.

5. The bearing assembly of claim 1, wherein the seal engages the first bearing cone and the second bearing cone.

6. The bearing assembly of claim 1, wherein the first protrusion is press-fitted within the first groove and the second protrusion is press-filled within the second groove.

7. The bearing assembly of claim 1, wherein the seal has a first end and a second end that overlaps the first end.

8. The bearing assembly of claim 7, wherein the first protrusion and the second protrusion terminate short of the first end and the second end, and wherein the second end defines a first groove and a second groove for receiving a portion of the first protrusion and a portion of the second protrusion when the second end of the seal overlaps the first end of the seal.

9. The bearing assembly of claim 1, wherein the seal includes a plurality of sealing bumps extending from an outer surface of the seal, and wherein at least one of the sealing bumps engages the first bearing cone and at least one of the sealing bumps engages the second bearing cone.

10. The bearing assembly of claim 9, wherein the seal includes a first end and a second end that overlaps the first end, the sealing bumps being positioned at the second end of the seal and not on a portion of the first end that is overlapped by the second end.

11. The bearing assembly of claim 1, wherein the first bearing cone and the second bearing cone each have an inner surface that together define a substantially cylindrical bearing cavity through the bearing assembly, and wherein the seal engages the first bearing cone and the second bearing cone and extends approximately 360 degrees around the inner surfaces of the first bearing cone and the second bearing cone.

12. The bearing assembly of claim 11, wherein the seal extends greater than 360 degrees around the inner surfaces of the first bearing cone and the second bearing cone.

13. The bearing assembly of claim 11, wherein the seal has a first end and a second end, and wherein the seal extends greater than 360 degrees around the inner surfaces of the first and second bearing cones such that the second end of the seal overlaps the first end of the seal.

14. A bearing assembly comprising:
a housing defining a cavity therethrough;
a first bearing cone positioned within the cavity;
a second bearing cone positioned within the cavity and spaced from the first bearing cone;
a first plurality of rollers positioned between and engageable with the housing and the first bearing cone;
a second plurality of rollers positioned between and engageable with the housing and the second bearing cone; and
a seal between the first bearing cone and the second bearing cone;
wherein the first bearing cone and the second bearing cone each have an inner surface that together define a substantially cylindrical bearing cavity through the bearing assembly, and wherein the seal engages the first bearing cone and the second bearing cone and extends greater than 360 degrees around the inner surfaces of the first bearing cone and the second bearing cone.

15. The bearing assembly of claim 14, wherein the seal has a first end and a second end that overlaps the first end.

16. The bearing assembly of claim 14, wherein the seal is at least partially non-metallic.

17. The bearing assembly of claim 14, wherein the seal engages the first bearing cone and the second bearing cone.

18. The bearing assembly of claim 14, wherein the seal includes a first protrusion and a second protrusion, and wherein the first bearing cone defines a first groove and the second bearing cone defines a second groove, the first protrusion being positioned within the first groove and the second protrusion being positioned within the second groove.

19. The bearing assembly of claim 18, wherein the first protrusion is press-fitted within the first groove and the second protrusion is press-fitted within the second groove.

20. The bearing assembly of claim 18, wherein the seal has a first end and a second end that overlaps the first end.

21. The bearing assembly of claim 20, wherein the first protrusion and the second protrusion terminate short of the first end end the second end, and wherein the second end defines a first groove and a second groove for receiving a portion of the first protrusion and a portion of the second protrusion, respectively, when the second end of the seal overlaps the first end of the seal.

22. A bearing assembly comprising:
a housing defining a cavity therethrough;
a first bearing cane positioned within the cavity;
a second bearing cone positioned within the cavity and spaced from the first bearing cone;
a first plurality of rollers positioned between and engageable with the housing and the first bearing cone;
a second plurality of rollers positioned between and engageable with the housing and to second bearing cone; and
a seal sealing the space between the first bearing cone and the second bearing cone;
wherein the seal includes a plurality of sealing bumps extending from an outer surface of the seal, and wherein at least one of the sealing bumps engages the first bearing cone and at least one of the sealing bumps engages the second bearing cone.

23. The bearing assembly of claim 22, wherein the plurality of sealing bumps are at least partially non-metallic.

24. The bearing assembly of claim 22, wherein the plurality of sealing bumps are at least partially polymeric.

25. The bearing assembly of claim 22, wherein the plurality of sealing bumps are at least partially elastomeric.

26. The bearing assembly of claim 22, wherein the seal engages the first bearing cone and the second bearing cone.

27. The bearing assembly of claim 22, wherein the seal has a first end and a second end that overlaps the first end.

28. The bearing assembly of claim 27, wherein the sealing bumps are positioned at the second end of the seal and not on a portion of the first end that is overlapped by the second end.

29. The bearing assembly of claim 22, wherein the first bearing cone and the second bearing cone each have an inner surface that together define a substantially cylindrical bearing cavity through the bearing assembly, and wherein the seal engages the first bearing cone and the second bearing cone and extends approximately 360 degrees around the inner surfaces of the first bearing cone and the second bearing cane.

30. The bearing assembly of claim 29, wherein the seal extends greater than 360 degrees around the inner surfaces of the first bearing cone and the second bearing cone.

31. The bearing assembly of claim 29, wherein the seal has a first end and a second end, and wherein the seal extends greater than 360 degrees around the inner surfaces of the first and second bearing cones such that the second end of the seal overlaps the first end of the seal.

32. A bearing assembly comprising:
a housing defining a cavity therethrough;
a first bearing cone positioned within the cavity;
a second bearing cone positioned within the cavity and spaced from the first bearing cone;
a first plurality of rollers positioned between and engageable with the housing and the first bearing cone;
a second plurality of rollers positioned between and engageable with the housing and the second bearing cone; and
a seal sealing the space between the first bearing cone and the second bearing cone;
wherein the seal has a first end and a second end that overlaps the first end.

33. The bearing assembly of claim 32, wherein the seal includes a first protrusion and a second protrusion, and wherein the first bearing cone defines a first groove and the second bearing cone defines a second groove, the first protrusion being positioned within the first groove and the second protrusion being positioned within the second groove; and 34. The bearing assembly of claim 33, wherein the first protrusion is press-fitted within the first groove and the second protrusion is press-fitted within the second groove.

35. The bearing assembly of claim 33, wherein the first protrusion and the second protrusion terminate short of the first end and the second end, and wherein the second end defines a first groove and a second groove for receiving a portion of the first protrusion and a portion of the second protrusion, respectively, when the second end of the seal overlaps the first end of the seal.

36. The bearing assembly of claim 35, wherein the sealing bumps are positioned at the second end of the seal and not on a portion of the first end that is overlapped by the second end.

37. The bearing assembly of claim 32, wherein the seal is at least partially non-metallic.

38. The bearing assembly of claim 32, wherein the seal engages the first bearing cone and the second bearing cone.

39. The bearing assembly of claim 32, wherein the seal includes a plurality of sealing bumps extending from an outer surface of the seal, and wherein at least one of the sealing bumps engages the first bearing cone and at least one of tube sealing bumps engages the second bearing cone.

* * * * *